United States Patent [19]
Zeller

[11] 3,914,010
[45] Oct. 21, 1975

[54] LIQUID LONG-WAVE PASS FILTER FOR HIGH INTENSITY LIGHT SOURCE

[75] Inventor: Sanford S. Zeller, Greenbrae, Calif.

[73] Assignee: The United States of America as represented by the Secretary of the Army, Washington, D.C.

[22] Filed: Nov. 25, 1974

[21] Appl. No.: 527,182

[52] U.S. Cl. .............. 350/3; 240/46.15; 240/107; 313/12; 350/312
[51] Int. Cl.² ........................................ G02B 5/24
[58] Field of Search ............ 350/3, 312, 267, 179; 240/9 A, 47, 46.15, 107; 313/22, 35, 112, 12

[56] References Cited
UNITED STATES PATENTS

| | | | |
|---|---|---|---|
| 1,565,590 | 12/1925 | Ritterrath | 350/3 |
| 1,895,887 | 1/1933 | Lorenz | 350/3 |
| 3,596,125 | 7/1971 | Seigel | 350/312 |

OTHER PUBLICATIONS

Ingersoll, *Applied Optics*, Vol. 10, No. 12, Dec. 1971, pp. 2781–2783.

*Primary Examiner*—Ronald J. Stern
*Attorney, Agent, or Firm*—Max L. Harwell; Nathan Edelberg; Robert P. Gibson

[57] ABSTRACT

A liquid long wave pass filter for absorbing visible light and passing infrared light emitted from a high intensity search light. The filter comprises two glass lenses, having a liquid tight cavity therebetween, in the path of the emitted light in which a dye coolant is pumped through the cavity to absorb visible light, pass infrared light, and remove heat from the lenses by circulating the dye coolant through a heat exchanger.

7 Claims, 2 Drawing Figures

LIQUID LONG-WAVE PASS FILTER FOR HIGH INTENSITY LIGHT SOURCE

BACKGROUND OF THE INVENTION

Prior long-wave light filters for high intensity light sources include filtering visible wave lengths by applying a solid coating to glass lens surfaces through which the light passes. These coatings not only reflected the visible light waves but reflected some of the infrared waves. Liquid filters have been used for filtering light waves by circulating a dye coolant within an arc chamber wherein the dye coolant passes directly over the reflector surfaces, against the outer glass envelope of the radiation source and the inner surface of a transparent glass window.

SUMMARY OF THE INVENTION

The present invention provides an improvement over the prior long-wave light filters in that the dye coolant does not deteriorate the light intensity by being in direct contact with the reflector and the radiation source but comprises two lenses that are positioned in the path of the light emitted from a high intensity light source wherein a dye coolant is uniformly circulated through the cavity formed between the two lenses to absorb certain wavelength light and remove heat generated by the light source. The uniform circulation is accomplished by pumping the dye coolant into the center of the cavity, forcing the dye coolant to circulate outward in all directions from the center to an outlet manifold around the periphery of the cavity, and then passing the dye coolant through a heat exchanger before being recirculated in a continuous cycle.

DETAILED DESCRIPTION OF THE PREFERRED EMBODIMENT

Figure 1:
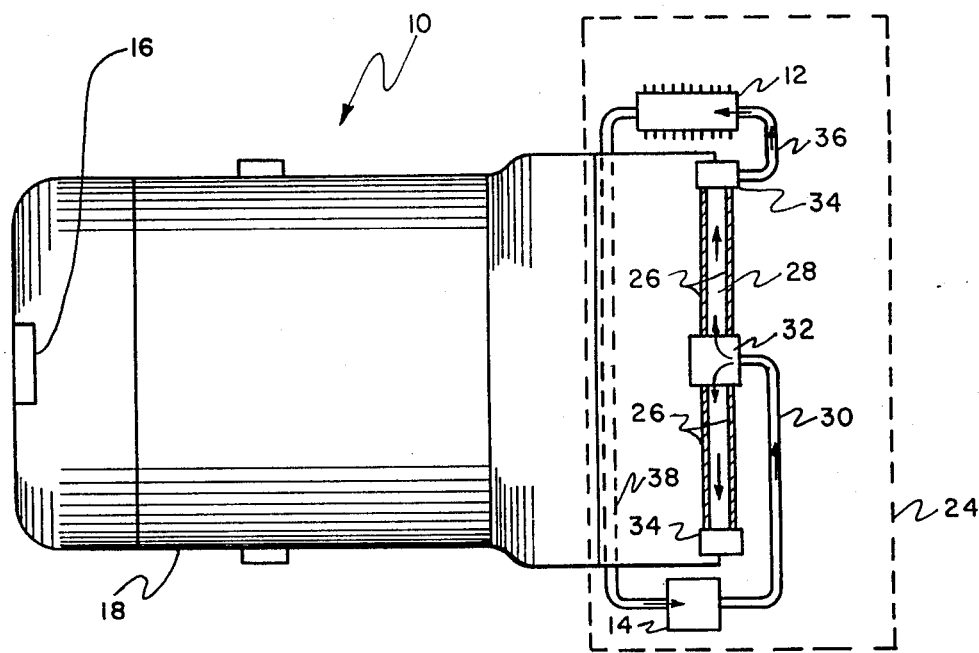
FIG. 1 illustrates an embodiment of the liquid long-wave pass filter which has a liquid-to-air heat exchanger.

In FIG. 1, numeral 10 refers to a high intensity search light housing wherein 18 represents the portion of housing 10 within which the search light is located and dashed line 24 enclosed one embodiment of a long-wave pass filter of the present invention. Fan 16 is used to pass cooling air over the search light. The high intensity search light may typically be 30 to 70 kilowatts in rated power but is not limited to this range.

Looking closer at the long wave pass filter to FIG. 1, a motor pump unit 14 pumps a dye coolant liquid in a closed circulating system. This dye coolant may typically be a mixture of 95% silicone oil and 5% iodine crystals, by weight. The iodine percentage could vary by a few percent to compensate for evaporation and for reaction with exposed metal surfaces. This solution is usable from −100° to +360° Fahrenheit. The path of the circulation dye coolant is from pump 14 through inlet pipe 30 into an inlet distribution chamber 32 at the center of glass lenses 26 which guides the dye coolant uniformly outward in all directions through a cavity 28 formed between glass lenses 26 and into an outlet manifold 34 at the periphery of the cavity formed between said glass lenses 26. The dye coolant then passes through outlet pipe 36 and flows through a liquid-to-air heat exchanger 12 with the cooled dye coolant flowing back to pump 14 by way of pipe 38. Distribution chamber 32 and pipes 30, 36, and 38 may be metal or glass. The dye coolant flow rate is about 5 gallons per minute, determined by the pump size. Glass lenses 26 may be made of Pyrex brand borosilicate glass.

The liquid-to-air heat exchanger 12 transfers heat, generated by the searchlight beam passing through the dye coolant and lenses 26, to the ambient air. Heat exchanger 12 may typically be made of aluminum with fins fabricated from aluminum, copper, stainless steel, or nickel alloys. These fins may range in thickness from 0.001 to 0.016 inches. The number of fins per inch may be from 5 to 50 and their heights may vary from 0.025 to 0.5 inches in height.

In the closed circulating system, all the dye coolant flows through the heat exchanger 12 during one cycle. Pump 14 may be a voluteless centrifugal pump having carbon bearings that is typical of circulating pumps used in thermal control systems. Such a pump is especially suited for relatively high flow rate and low pressure rise of transport fluids with high density and low viscosity as in this application.

Figure 2:
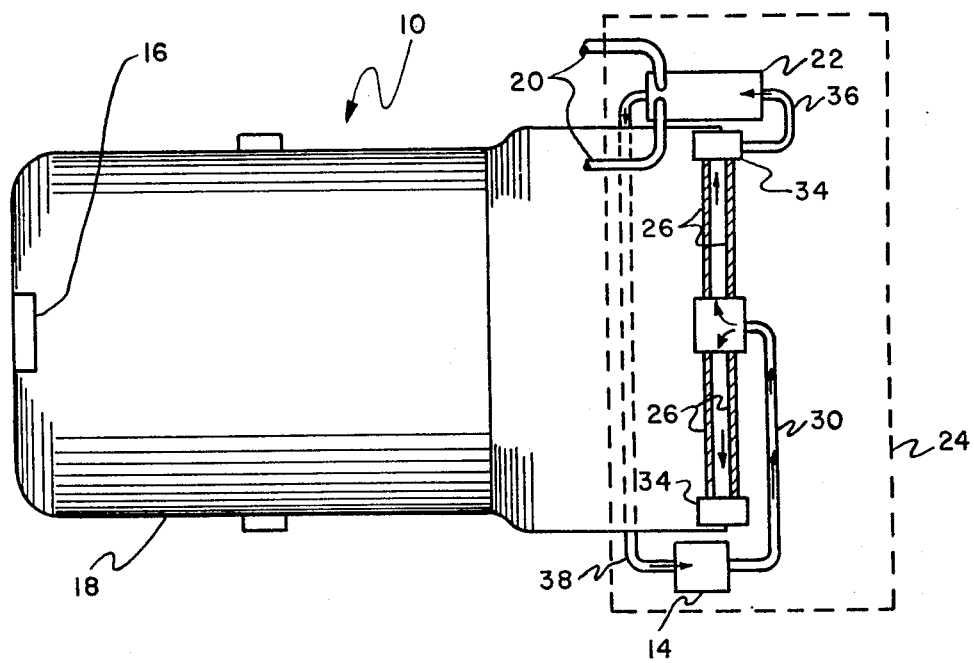
FIG. 2 illustrates a second embodiment of the invention which has a liquid-to-liquid heat exchanger.

FIG. 2 illustrates a second embodiment of the liquid long-wave pass filter, in this case using a liquid-to-liquid heat exchanger 22. All of the numerals and their referenced functions as referred to in FIG. 1 are the same for FIG. 2, with the exception of new numerals 22 for the liquid-to-liquid heat exchanger and connection pipes 20 that provides a flow path through 22 for the cooling liquid. The same cooling liquid that flows through pipes 20 may also be pumped past the electrodes of the search light. The search light, its electrodes, and the pump used for pumping the cooling liquid are not shown since such electrode cooling systems are known in the art. The search light electrode cooling liquid that doubles as a heat exchanger cooling liquid is fresh water, or distilled water, at 65° Fahrenheit that flows at about 10 gallons per minute. Alternatively, a 35 percent mixture of ethylene glycol with 65% fresh water may be used. However, since this mixture has corrosive and dielectric characteristics, the pump motors would be operated dry. Heat exchanger 22 preferably has cross-flow but may have counterflow circulation of the cooling liquid.

While only two embodiments have been described, it will be understood that the details may be varied by those skilled in the art without departing from the spirit of the present invention.

I claim:

1. A liquid long-wave pass filter for a high intensity light source, the filter comprising:

two circular glass lenses in close proximity to each other and in the path of light emitted from said high intensity light source, said lenses forming the end faces of a liquid tight cavity therebetween with an inlet distribution chamber at the center of said cavity and an outlet manifold around the periphery of said cavity;

a dye coolant liquid having visible light wavelength absorbing and infrared wavelength passing characteristics enclosed in a closed circulation system, said dye coolant comprising 95% silicone oil and 5% iodine crystals by weight;

means for circulating said dye coolant through said cavity by entering through said inlet distribution chamber for circulating radially outward from said inlet distribution chamber and exiting out said outlet manifold wherein said dye coolant absorbs said visible light and passes said infrared light through said lenses; and means for cooling said dye coolant after passing through said outlet manifold for removing heat generated by absorption of said visible light.

2. A liquid long wave pass filter as set forth in claim 1 wherein said two circular glass lenses comprise borosilicate glass.

3. A liquid long wave pass filter as set forth in claim 1 wherein said means for circulating said dye coolant is a voluteless centrifugal pump.

4. A liquid long wave pass filter as set forth in claim 3 wherein said means for cooling said dye coolant is a liquid-to-air heat exchanger.

5. A liquid long wave pass filter as set forth in claim 3 wherein said means for cooling said dye coolant is a liquid-to-liquid heat exchanger having a cooling mixture of 65% fresh water and 35% ethylene glycol circulating therethrough.

6. A liquid long wave pass filter as set forth in claim 5 wherein said cooling mixture flows through said liquid-to-liquid heat exchanger in counterflow to said dye coolant.

7. A liquid long wave pass filter as set forth in claim 5 wherein said cooling mixture flows through said liquid-to-liquid heat exchanger in crossflow to said dye coolant.

* * * * *